244-121 SR
10/7/86 OR H 000,139

United States Statutory Invention Registration [19]

[11] Reg. Number: H139
[43] Published: Oct. 7, 1986

Task

[54] REMOVABLE CLEANABLE ANTIREFLECTION SHIELD

[75] Inventor: Harry L. Task, Watertown, Mass.

[73] Assignee: The United States of America as reperesented by the Secretary of the Air Force, Washington, D.C.

[21] Appl. No.: 690,212

[22] Filed: Jan. 10, 1985

[51] Int. Cl.[4] ..... B64D 45/00; B60J 3/00
[52] U.S. Cl. ..... 244/121; 296/97 C
[58] Field of Search ..... 244/121; 296/97 R, 97 C

[56] References Cited

U.S. PATENT DOCUMENTS

| | | | |
|---|---|---|---|
| 2,207,224 | 7/1940 | Meares | 296/97 E |
| 2,253,766 | 8/1941 | Crowell | 296/97 |
| 2,596,836 | 5/1952 | Bruhl | 296/97 E |
| 3,105,990 | 10/1963 | Harris, Jr. et al. | 250/35 |
| 3,704,844 | 12/1972 | Wolf | 244/121 |
| 4,005,899 | 2/1977 | Rigney | 296/97 E |
| 4,065,171 | 12/1977 | Nagy | 296/97 E |
| 4,399,347 | 8/1983 | Schmitt | 219/203 |
| 4,449,747 | 5/1984 | Morgan et al. | 296/97 |

*Primary Examiner*—Deborah L. Kyle
*Assistant Examiner*—Michael J. Carone
*Attorney, Agent, or Firm*—Donald J. Singer; Bobby D. Scearce

[57] ABSTRACT

A replaceable anti-reflection shield for the glare surface beneath the windscreen of a vehicle is described which comprises a flexible panel of light absorbing material, such as black cloth, velvet, canvas or plastic, of size and configuration corresponding to that of the glare surface for placement on and conformance to the contour of the glare surface beneath the windscreen, and peripheral attaching means such as adhesive strips, snaps, Velcro® strips, suction cups, or similar devices, on the flexible panel for detachably securing the peripheral edges of the panel to the glare surface, whereby the panel is easily removed for cleaning or replacement.

5 Claims, 3 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

REMOVABLE CLEANABLE ANTIREFLECTION SHIELD

RIGHTS OF THE GOVERNMENT

The invention described herein may be manufactured and used by or for the Government of the United States for all governmental purposes without the payment of any royalty.

BACKGROUND OF THE INVENTION

The present invention relates generally to anti-glare windscreens for vehicles and more particularly to a novel anti-reflection shield for use in conjunction with the windscreen of a vehicle which shield is easily removable for cleaning or replacement.

Aircraft cockpits are typically arranged such that, from the pilot's line of sight, much of the reflected surface observed is a flat black glare shield. Unfortunately, on many aircraft the glare shield surface is difficult to clean and becomes coated with a fine layer of dust, or becomes damaged by scratches. The dust layer or scratches reduce the effectiveness of the glare shield by reflecting sunlight onto the windscreen causing a substantial loss of contrast viewing through the windscreen and thereby substantially reducing the ability of the pilot to visually acquire information.

The present invention provides a flexible anti-glare shield that can be used in conjunction w1th the existing windscreen of an aircraft or over an existing glare shield thereof to reduce reflections and thus improve contrast vision through the windscreen. The anti-reflection shield of the present invention finds substantial utility within the cockpit of an aircraft to improve contrast vision of the pilot through the windscreen by reducing reflections, and to provide an anti-reflective panel which is easily removable for cleaning or replacement. The invention comprises a form fitted flexible panel for covering the glare surface beneath the windscreen, may comprise a substantially transparent washable panel for covering an existing glare shield, and may be adapted for use on most aircraft. The anti-reflective shield of the invention may also be adapted for use in conjunction with the windscreens of other types of vehicles.

It is, therefore, a princlple object of the present invention to provide an improved anti-glare windscreen.

It is a further object of the invention to provide an antireflective shield for use in conjunction with an existing windscreen of a vehicle.

These and other objects of the invention will become apparent as the detailed description of certain representative embodiments thereof proceeds.

SUMMARY OF THE INVENTION

In accordance with the foregoing principles and objects of the present invention, a replaceable anti-reflection shield for the glare surface beneath the windscreen of a vehicle is described which comprises a flexible panel of light absorbing material, such as black cloth. velvet canvas or plastic of size and configuration corresponding to that of the glare surface for placement on and conformance to the contour of the glare surface beneath the windscreen, and peripheral attaching means such as adhesive strips snaps, Velcro® strips, suction cups, or similar devices, on the flexible panel for detachably securing the peripheral edges of the panel to the glare surface, whereby the panel is easily removed for cleaning or replacement.

DESCRIPTION OF THE DRAWINGS

The present invention will be more clearly understood from the following detailed description of certain representative embodiments thereof read in conjunction with the accompanying drawings wherein.

DETAILED DESCRIPTION

Figure 1:
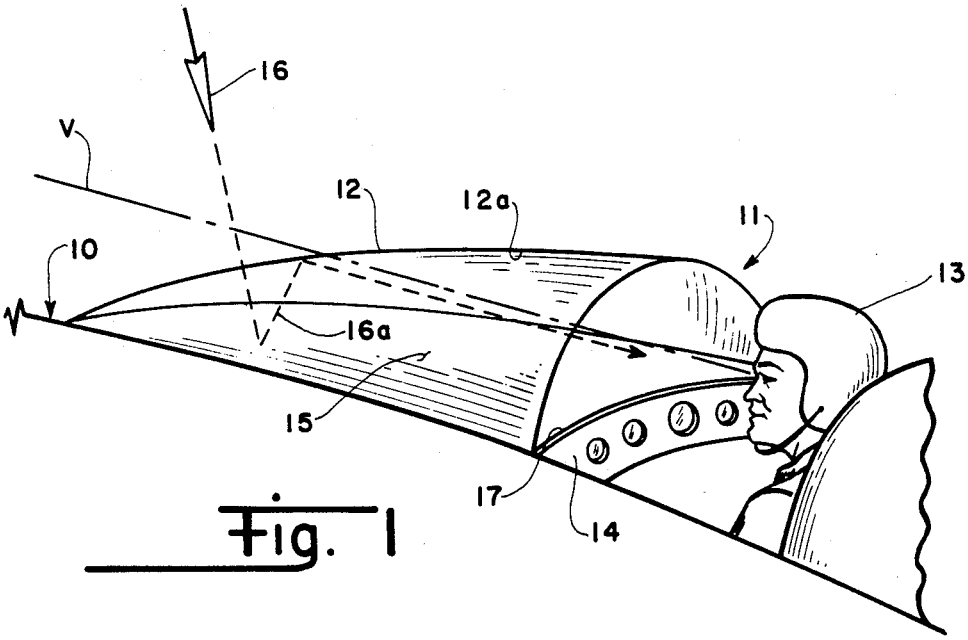
FIG. 1 is a partial perspective view of the cockpit area of an aircraft illustrating the placement and function of the shield of the invention.

Referring now to FIG. 1, shown therein is a perspective view of a part of the cockpit 11 area of an aircraft 10 illustrating the placement and function of the shield of the present invention. As shown in FIG. 1, aircraft 10 may typically include a substantially transparent windscreen 12 through which pilot 13 visually acquires information for operation of aircraft 10. Instrument panel 14 is disposed in front of pilot 13 behind and beneath a glare surface 15 defined beneath windscreen 12. The area of glare surface 15 is. in many aircraft. of substantial size by reason of the aerodynamic contour of windscreen 12 (such as illustrated) characterizing in part the structure of aircraft 10. A glare shield (not shown) of conventional configuration may be disposed near instrument panel 14 on or near glare surface 15 beneath windscreen 12.

In the operation of aircraft 10, extraneous light 16 incident upon and passing through windscreen 12 and reflecting off glare surface 15 and lower (inner) surface **12*a* of windscreen 12, as illustrated by dashed line 16*a*, may constitute glare and interfere with the ability of pilot 13 to visually acquire information near or along a desired viewing axis. such as forward viewing axis V. This problem may be compounded by the existence of scratches, dust or film on inner surface 12*a* of windscreen 12 or on glare surface 15 beneath windscreen 12, which problem is not solved by placement of conventional glare shields provided by the prior art. Therefore. in accordance with the teachings of the present invention an anti-reflective shield comprising a form-fitted flexible panel 17. of size and shape corresponding substantially to that of glare surface 15. may be placed on surface 15 forward of instrument panel 14 and beneath windscreen 12. Panel 17 is preferably flexible in order to conform to the contour of surface 15**, and may comprise a removable sheet of black velvet, light-absorbing cloth or canvas, or other suitable materials or structures, such as a velvet coated plastic panel, or a combination of adjacent plastic panels connected in abutting relationship by cloth hinges, which provide a black or otherwise non-reflecting and light-absorbing surface which may be cleaned.

Figure 2:
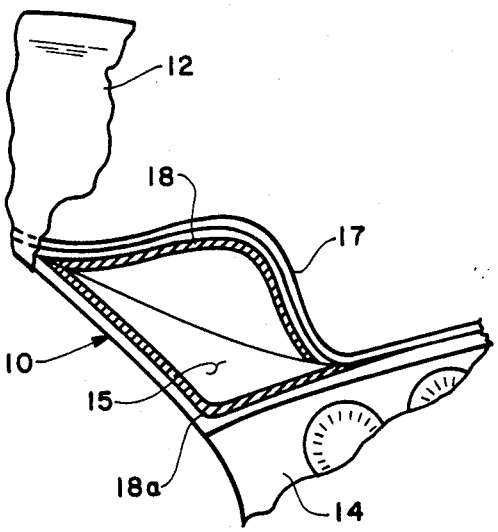
FIG. 2 is a partial view of the glare surface of the cockpit of FIG. 1 illustrating placement and fastening of the shield of the invention.
Figure 3:
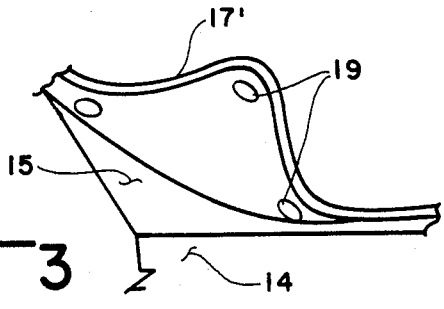
FIG. 3 illustrates alternative fastening means for the shield of the invention.

Referring now to FIG. 2, shown therein is a partial view of instrument panel 14, glare surface 15, windscreen 12, and panel 17 partially in place on surface 15, to illustrate one configuration for securing panel 17 to surface 15 beneath windscreen 12. Fastening means in the form of adhesive strips such as Velcro® strips 18 may be incorporated into panel 17 around the periphery thereof for releaseably attaching panel I7 to surface 15;

accordingly. mating strips 18*a* for mating with strips 18 may be secured conventionally to surface 15. Alternatively. as shown in FIG. 3, an anti-reflective panel 17' may be secured to surface 15 by snaps or suction cups 19 incorporated into the periphery of panel 17'. Other equivalent fastening means may be used to secure anti-reflective panel 17 to glare surface 15, as would occur to one with skill in the field of this invention, the specific examples being merely exemplary of fasteners contemplated within these teachings. to provide a readily removable flexible panel 17. Therefore, when the material which panel 17 comprises becomes soiled by dust, film or other deposit, or becomes scratched or otherwise damaged such that the anti-glare character thereof is impaired, panel 17 may be removed for washing or repair, as appropriate. and a replacement conveniently and quickly installed.

The present invention therefore provides an improved removable anti-reflection shield for use in conjunction with the windscreen of an aircraft or other vehicle to substantially eliminate glare. It is understood that certain modifications to the invention as described herein may be made, as might occur to one skilled in the field of the invention, within the scope of the appended claims. Therefore, all embodiments contemplated hereunder which achieve the objects of the invention have not been shown in complete detail. Other embodiments may be developed without departing from the spirit of this invention or from the scope of the appended claims.

I claim:

1. A removable anti-reflective shield for covering the glare surface beneath the windscreen forward of the instrument panel of an aircraft to substantially eliminate light reflection from said glare surface, comprising:

a. a flexible panel of light absorbing material of size and configuration corresponding to that of said glare surface for placement on and conformance to the contour of said glare surface beneath said windscreen forward of said instrument panel; and b. attaching means on substantially the entire periphery of said flexible panel for detachably securing the peripheral edges of said flexible panel to said glare surface.

2. The glare shield as recited in claim 1 wherein said flexible panel comprises a black material selected from the group consisting of velvet, cloth, canvas, and plastic.

3. The glare shield as recited in claim 1 wherein said peripheral attaching means comprises adhesive strips.

4. The glare shield as recited in claim 1 wherein said peripheral attaching means comprises suction cups.

5. The glare shield as recited in claim 1 wherein said peripheral attaching means comprises snaps.

* * * * *